United States Patent [19]

Lemmerman et al.

[11] Patent Number: 4,971,206
[45] Date of Patent: Nov. 20, 1990

[54] VIDEO CASSETTE DISPLAY MODULE FOR SLOT-WALL MERCHANDISING

[76] Inventors: Marvin C. Lemmerman, 2234 S.E. 8th Pl., Renton, Wash. 98055; Robert J. Petersen, 9789 S.E. 41 St., Mercer Isl., Wash. 98040

[21] Appl. No.: 270,391

[22] Filed: Nov. 10, 1988

Related U.S. Application Data

[63] Continuation of Ser. No. 71,350, Jul. 9, 1987, abandoned.

[51] Int. Cl.$^5$ ............................................. A47G 29/00
[52] U.S. Cl. .......................................... 211/41; 211/94
[58] Field of Search .................. 211/41, 42, 88, 71, 211/134, 94, 13, 162; 206/387; 312/9, 10, 15, 17

[56] References Cited

U.S. PATENT DOCUMENTS

| | | | |
|---|---|---|---|
| 887,631 | 5/1908 | Hawthorne | 312/10 |
| 3,138,261 | 6/1964 | Witteborg | 211/41 |
| 4,131,203 | 12/1978 | Bridges | 211/88 |
| 4,257,524 | 3/1981 | Yonkers et al. | 312/15 X |
| 4,572,381 | 2/1986 | Breakey et al. | 211/94 |
| 4,573,588 | 3/1986 | Cohen | 211/41 |
| 4,584,950 | 4/1986 | Adams et al. | 211/41 |
| 4,684,027 | 8/1987 | Wright | 211/40 |

Primary Examiner—Alvin C. Chin-Shue
Assistant Examiner—Sarah A. Lechok
Attorney, Agent, or Firm—Carl G. Dowrey; Christopher John Rudy

[57] ABSTRACT

Video Cassette holder/shelf for mounting on vertical surfaces of slot-wall for merchanising purposes. The holder is a module with bi-model display capacity and intercongruous or modular design characteristics. Each module has vertical walled recesses for displaying cassettes upright and at an angle relative to a vertical display wall surface and a tray with tilted bottom and back wall surfaces for displaying cassettes face-out and parallel to the vertical display wall surface.

14 Claims, 2 Drawing Sheets

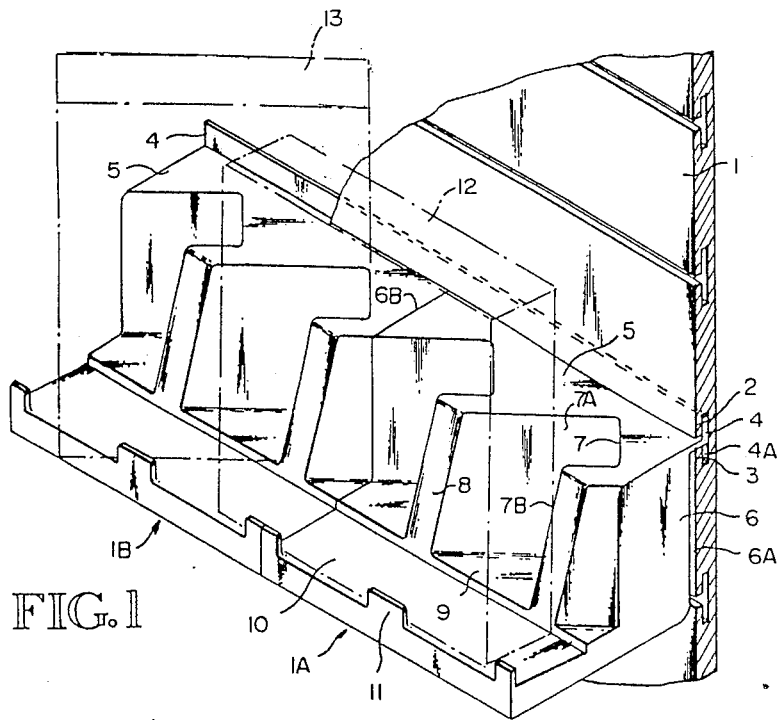
FIG. 1
FIG. 2
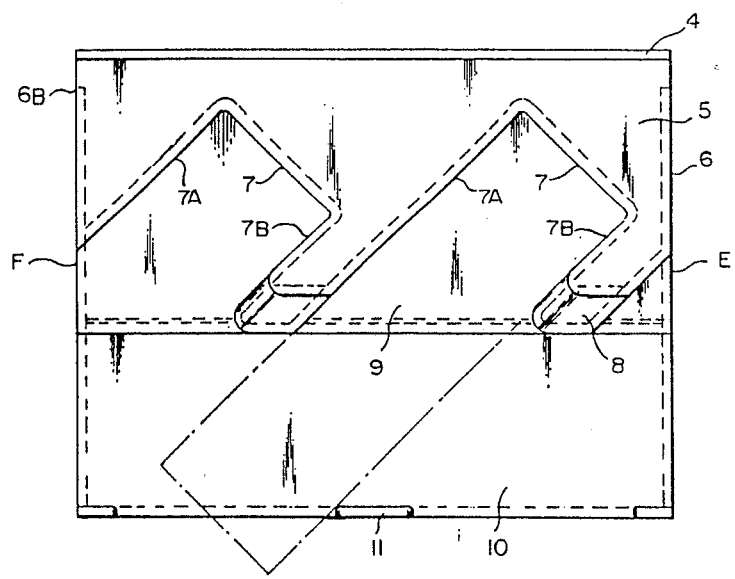

VIDEO CASSETTE DISPLAY MODULE FOR SLOT-WALL MERCHANDISING

This application is a continuation of application Ser. No. 071,350, filed Jul. 9, 1987, now abandoned.

BACKGROUND OF THE INVENTION

1. Field of the Invention

The present invention relates to a holder/shelf accessory to slot-wall panel merchandising and more particularly to a video cassette display module for such use. Following the success of the video cassette recorder (VCR) in the marketplace, the business of renting and/or selling movies for home viewing has grown phenomenally since 1980. At first, merchandising techniques were often ignored in the scramble for business. Now, as competition has become fierce, video store operators are sharpening their marketing skills in an effort to get greater selection on their shelves but, at the same time, win sales through effective product presentation.

To this end, slot-wall (or slat-wall) is being widely used today because it is attractive and utilizes space efficiently. Slot-wall is basically a four-foot by eight-foot panel of three-quarter inch particle-board (dimensions may vary) with parallel channels, usually T-shaped, routed straight across one dimension and spaced on equal centers over the surface. The purpose of the panel is to form the extended vertical surface of a display wall or other display merchandiser and the routed channels, or "slots", form the female receptacle for display holders/shelves having by design corresponding male interengaging appendages. This merchandising technique is very effective but the less expensive accessories associated with slot-wall and used by video outlets have been less than satisfactory.

2. Description of the Prior Art

Video cassettes are packaged for marketing in individual containers which are decorated exteriorly with promotional material designed to stimulate visually the impulse buying habits of the home-movie market. Often these promotional jackets are placed on display with the package contents (the video cassette) being kept behind the work counters of the store. On the display shelves, the promotional material can be "stocked" side-by-side, like books, with spines only viewable by the buying public or it can be "displayed" with the merchandising jackets showing to their best advantage. The stocking mode gives the store manager maximum product quantity on his/her shelves but the space consuming display mode wins sales.

There are currently, to the inventors' knowledge, three basic means of merchandising video cassettes on slot-wall: the standard shelf, the tray and the video cassette holder. Standard shelves are hand-fabricated by bending sheet plastic on "heat-strips". This weakens the molecular structure of the material at the line of bend, especially in the dimensionally thin stock used in this instance, rendering it fragile. Trays are usually made by plastic extrusion. They are less expensive but tend to warp. The holder, commonly referred to as the "widget", is injection molded plastic and inexpensive. The design tends to be sloppy in its slot mount making contents insecure and leading to considerable breakage. On the standard shelf, one can stock video cassettes much the same as books; i.e. side-by-side with spines only viewable or face-out with a frontal view of the jacket cover showing. A four-foot slot-wall shelf will accommodate, side-by-side, about 30 cassettes maximum —less if any are positioned face-out. In the case of the face-out positioning on standard shelves, the cassette is obscured by its neighbor when viewed from side angle because the viewing plane differs from cassette to cassette. The slot-wall tray will accept video cassettes in the face-out position only with a four-foot tray accommodating about 10 cassettes. The "widget" holds one video cassette obliquely to the vertical plane of the slot-wall at a viewing angle of 45 degrees displaying the spine and a desired portion of the frontal jacket. A four-foot section of slot-wall will accommodate for display about 17 widgets and their contents.

Considering the foregoing, the video store manager's problem is, then, to achieve the right balance between what the writer has called "the stocking mode and the display mode". The inventors feel they have achieved the optimum marriage of these two considerations and have frozen their concept in a superior plastic merchandiser that can be economically mass-produced.

OBJECT OF THE INVENTION

It is the object of this invention to reduce the over-all cost of display over conventional methods of slot-wall merchandising in video outlets while improving on the quality of display.

It is another object of this invention to lessen the demands on the time and skill of video store personnel by supplying them with a fool-proof displaying tool.

A further object of this invention is to enable the video store manager to increase the selection or quantity of movies on cassettes in his/her existing facility without jeopardizing the appeal and selling power of merchandising display.

It is a still further object of this invention to provide the merchandiser of video cassettes with a holder/shelf that is stronger and more durable yet inexpensive to produce and to supply.

BRIEF SUMMARY OF THE INVENTION

The invention is an intercongruous or modular holder/shelf accessory to slot-wall merchandisers formed of plastic, injection-molded to dimensions accommodating most video cassette movies for home viewing. The holder/shelf provides surfaces which both support and securely hold a video cassette package either obliquely to the slot-wall at a 45° angle or parallel to the wall in faced out display positions while maintaining a common viewing plane.

BRIEF DESCRIPTION OF THE DRAWINGS

To realize on paper the invention set forth in the appended detailed description and claims, drawings are presented conjunctively in which:

FIG. 1 is an isometric illustration of two units of the invention mounted contiguously on a vertical surface of slot-wall;

FIG. 2 is a top plan view of the invention

DETAILED DESCRIPTION OF THE PREFERRED EMBODIMENT

Figure 3:
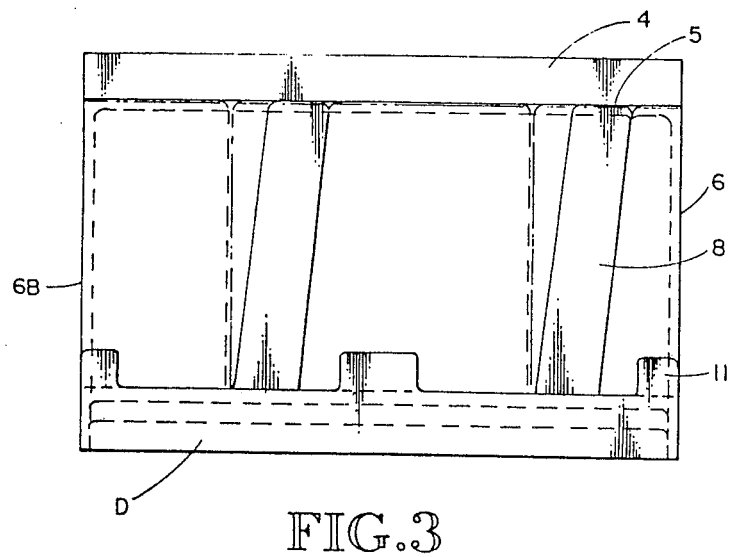
FIG. 3 is a front elevational view of the invention.

Referring now to the drawing wherein like reference numerals indicate identical parts in the various views, two identical modules indicated generally at 1A and 1B, are shown in side-by-side relationship mounted on the slot-wall panel 1.

The preferred embodiment of the module is formed of injection-molded plastic with a wall thickness of 0.090 inches, an over-all height of 3.687 inches, an over-all width of 5.625 inches and an over-all depth of 4.125 inches. It will be understood, however, that these dimensions are given by way of example and may be varied without departing from the spirit and scope of the invention.

On a plane with the uppermost horizontal surface 5 of the module and extending straight back 0.25 inches is a tongue or appendage 4 which then turns up perpendicularly for 0.46 inches. This appendage 4 transverses the full width of the unit at this point. From its base to its top, the overall module unit slims by one-half degree from the perpendicular on both sides. This is to facilitate extraction of the part from the mold during production, as is well known in the art. The appendage interengages with the slot 4A routed into the vertical merchandising panel of slot-wall 1 as may best be seen in FIG. 1. The vertical portion of the appendage 4 extends upward behind the upper lip 2 of the slot 4A where it prevents forward movement of the module. The horizontal portion of the appendage 4 rests on top of the lower lip 3 of the slot 4A and supports the weight of the unit. From the point where the appendage 4 meets with the main body of the module and covering entirely that plane of the unit one would refer to as the side, the plastic forms a right side surface 6 as seen in FIG. 1 which reinforces and stabilizes the module. The rear vertical edge 6A of the side 6 provides support as it rests against the vertical surface of the merchandising panel when in use. Likewise a left side surface 6B is formed and includes a rear vertical edge (not shown) for the same purpose.

The uppermost horizontal surface 5 extends forward from the slot-engaging appendage 4 on a plane form whence it cascades downward forming vertical walls defining recesses. At two forward points, where the angle of descent is five degrees less than perpendicular, the cascade as indicated creates an inclined surface 8 against which video-cassettes 12 can be propped as shown in phantom in FIG. 1. The large, oblique recesses have perpendicular walls 7, 7A, 7B as best viewed in FIGS. 1 and 2. The walls 7 and 7A and 7 and 7B are at right angles to each other. The surfaces of the walls 7, 7A and 7 and 7B form a slot or recess 1.437 inches wide with surface 7 forming the back wall thereof. The wall surfaces 7A and 7B form retaining and spacing walls designed to accommodate a video-cassette 13 being obliquely displayed as shown in phantom in FIG. 1. Further contributing to this task are right and left side buttress tabs 11 located where the planes of the wall surfaces 7A and 7B intersect with the plane D which forms the front wall of the module. These buttress tabs 11 help position and stabilize the video-cassette in the slot for display purposes as may best be seen in plan view in FIG. 2. The edge of the unit between the tabs 11 and the bottom wall 9 between the retaining walls 7A and 7B lie on a common horizontal plane and form the supporting floor upon which the displayed objects will rest.

To appreciate the positioning of the slots in each module it may be helpful to visualize a contiguous row of these oblique display recesses and then dissect the row at right angles at points so placed as to allow, off-centered between the two lines of dissection, one full cassette display lying obliquely from back TO front as may best be seen in FIG. 2. to the right and to the left of this full cassette slot, is located one-half of another identical slot, either the rear half or the forward half, which will find its functional "other half" by crossing the line of row dissection. These "dissection" lines are indicated at E and F on FIG. 2. Thus the units are modular in that each unit contributes to the function of its neighbor in such a way as to double the display capacity of a single unit when it is used in conjunction with other units placed right and left.

Figure 4:
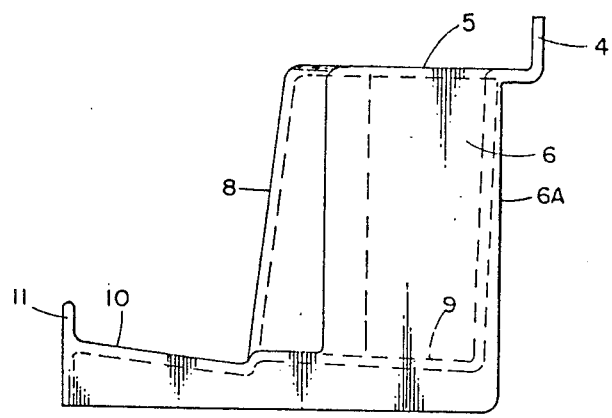
FIG. 4 is a side elevational view of the invention.

Transversing the front portion of the module is a tray 10 measuring 1.625 inches in depth. The floor of the tray is tilted five degrees off the horizontal so that the line of its surface is at right angle to the cascading bulwark wall 8 mentioned earlier. This tray forms a "face-out" display position for a video-cassette, as shown in phantom in FIG. 1, and the five degree tilt assures that the cassette will lean into the unit and not fall forward. The angle of the tray 10 and wall 8 may best be seen in FIG. 4.

The rowed sequence of buttress tabs 11 along the upper forward edge of the module serve a dual purpose. When video-cassettes, such as the cassette 12 in FIG. 1, are displayed in a "face-out" position, the tabs 11 serve as guard-rails for the product. When the video-cassette, such as the cassette 13 in FIG. 1, is displayed obliquely, the tabs serve as spacers and the outer edges stabilize the product on the leading edge of the slot or recess.

The rules of product merchandising dictate that there be visual uniformity of display to the right and to the left in a retail store. To satisfy this requirement the module may be produced with a right-handed and a left-handed version. One version will simply be a mirror-reflection of the other.

What is claimed is:

1. A bimodal display module for displaying video cassette containers and like objects comprising in combination:
   body means forming an elongated upright recess having at least one open end,
   elongated generally horizontal tray means extending at an oblique angle to said recess at substantially the same elevation thereof adjacent said at least one open end, and
   means forming at least one upright support adjacent said at least one open end, said upright support means being located in a plane extending parallel with the longitudinal axis of said tray means and substantially normal to the plane of said tray means,
   such that a display object can be inserted into said recess and extend across said tray means at an oblique angle thereto in a first display position or be placed on said tray means and supported against said upright support means in a second display position,
   wherein at least one stop means, extending upwardly on said tray means and spaced from said upright support means for contacting a bottom edge of the display object to retain the display object on said tray means in the second display position, is present.

2. The display module of claim 1, adapted for mounting on a vertical slot-wall display panel surface with said tray means extending parallel thereto including:
   attaching means on said body means for engaging retaining means on said slot-wall panel surface to provide vertical and rotational support for said module, said body means having back side surfaces for contacting said slot-wall surface in a wall mounted position.

3. The display module of claim 2, including bottom surfaces on said body means extending in a plane normal to said back side surfaces, such that said module can be supported on a horizontal support surface.

4. The display module of claim 1, wherein said stop means are stop tab means, said stop tab means having at least one vertical edge thereof aligned with a wall of said recess for aligning the display object in said recess and extending across said tray means in the first display position.

5. The display module of claim 4, wherein the plane of said tray is inclined downwardly toward said recess to hold the display object in a tilted second display position.

6. The module of claim 4, wherein said recess includes a bottom wall inclined downwardly away from said at least one open end, and the edge of said tray means remote from said recess is located in the general plane of said bottom wall, such that the display object in the first display position rests on said bottom wall and the edge of said tray means remote from said recess.

7. A bimodal display module for displaying generally narrow rectangular objects having a display face such as video cassette containers and the like comprising:

body means having front and rear sides and including means forming an elongated recess including a bottom support wall and an open end of the front side of said module, at least one generally upright support surface associated with the open end of said recess, an elongated support tray surface extending transversely in front of the at least one generally upright support surface and being substantially normal thereto at the general elevation of said bottom wall, the longitudinal axis of said tray surface being disposed at an oblique angle relative to the longitudinal axis of said recess, and the at least one generally upright support surface located in a plane extending parallel with the longitudinal axis of said tray surface, such that a generally narrow rectangular display object can be displayed with its bottom resting on the bottom wall of said recess and extending across said tray surface to expose a display face of the generally narrow display object obliquely to the axis of said tray surface and its back side supported against the at least one generally upright support surface, wherein at least one stop means, extending upright on the front edge of said tray surface remote from the at least one generally upright support surface for retaining said display object on said tray surface in its face-out display position, is present.

8. The display module of claim 7, wherein said stop means are stop tab means, said stop tab means including at least one vertical edge located in the plane of one wall of said recess for aligning said display object in the recess in the oblique display position.

9. The display module of claim 7, wherein said body means includes spaced opposing side walls defining said recess, the at least one generally upright support surface being located on the outer edge of one said side walls, and wherein said stop means are upright stop tab means located along the front edge of said tray surface remote from the at least one generally upright support surface, said stop tab means having vertical side edges in the planes of said side walls, such that said stop tab means retain an outer bottom edge of said display object on said tray surface in the face-out display position and serve to align said display object with said walls when in the oblique display position.

10. The display module of claim 7, wherein said tray surface is rearwardly downwardly inclined toward said recess to hold said display object in a rearwardly tilted position against the at least one generally upright support surface in the face-out display position.

11. The display module of claim 10, wherein the bottom wall of said recess is rearwardly downwardly inclined away from said tray surface, and the front edge of said tray surface remote form said recess lies generally in the plane of the bottom wall of said recess.

12. A bimodal modular display system for video cassette containers and like objects, composed of a plurality of identical display modules, said modules when assembled end-to-end forming a continuous tray with a plurality of obliquely oriented parallel upright recesses having one end thereof opening into said tray, each said module comprising:

body means having first and second end walls and wall means defining a first elongated upright recess having at least one open end, elongated generally horizontally extending tray means reaching between said end walls at an oblique angle to said first recess adjacent the at least one open end, said first recess having a full depth recess for accommodating an object to be displayed resting thereon and extending at an oblique angle across said tray, said body means further having wall means forming a predetermined recess segment on each side of said first recess and adapted to form full recesses in combination with the body means of an identical module placed on either side thereof, such that a plurality of said modules may be placed end-to-end to provide a series of oblique display positions or face-out display positions for a plurality of objects in series, wherein upright support surfaces, adjacent the open ends of said recesses, are present, said support surfaces extending normal to the plane of said tray and located in a plane extending parallel with the longitudinal axis of said tray, such that an object placed in the face-out display position rests on said tray and is supported in the upright position by said support surfaces, and wherein stop tab means on said tray, spaced from said support surfaces, for retaining the object on said tray means in the face-out display position, are present, said stop tab means including at least one vertical edge located in the plane of one wall of an associated recess for aligning the objects in said recesses in the oblique display position.

13. The display system of claim 12, adapted for mounting on a vertical slot-wall display panel surface with said tray means extending parallel thereto, wherein each said module includes:
   attaching means on said body means for engaging retaining means on said slot-wall surface to provide vertical and rotational support for the associated module,
   said body means having back side surfaces for contacting said slot-wall surface in a wall mounted position.

14. The display system of claim 13, including bottom surfaces on said body means extending in a plane normal to said back side surfaces,
   such that said modules can be supported on a horizontal support surface.

* * * * *